United States Patent Office 2,816,372
Patented Dec. 17, 1957

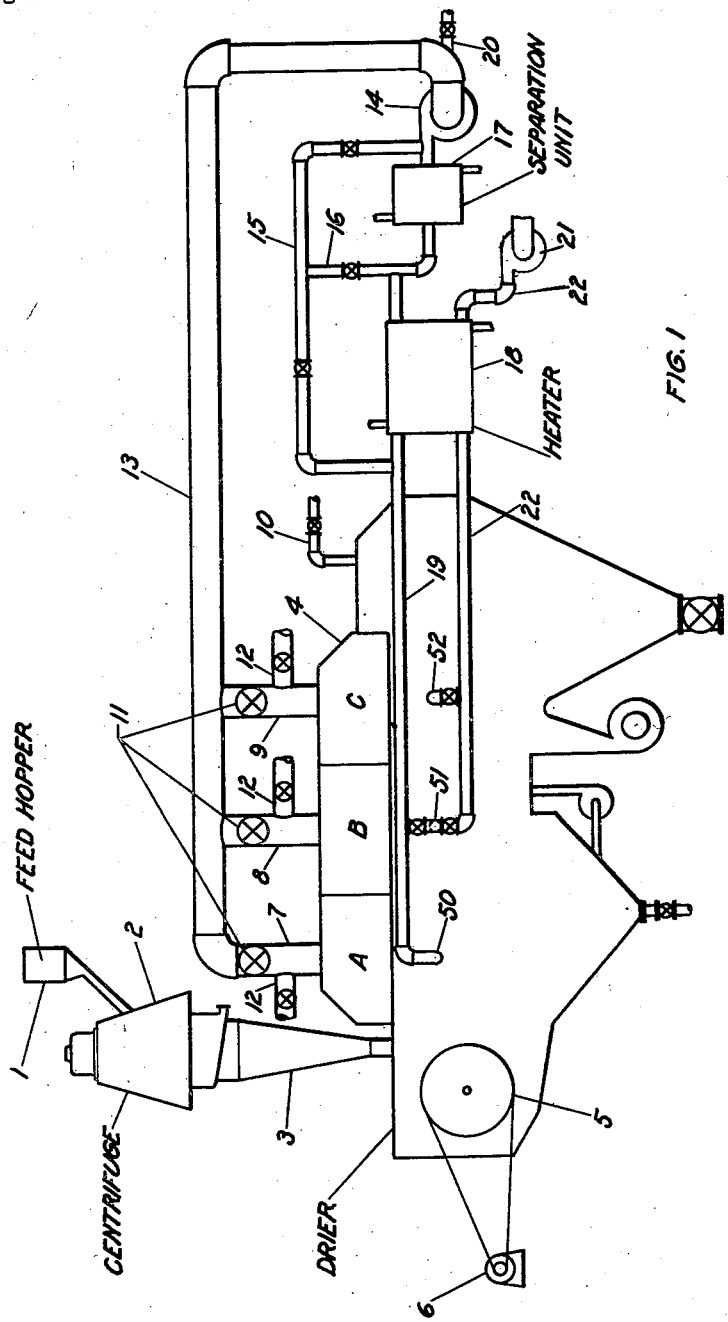

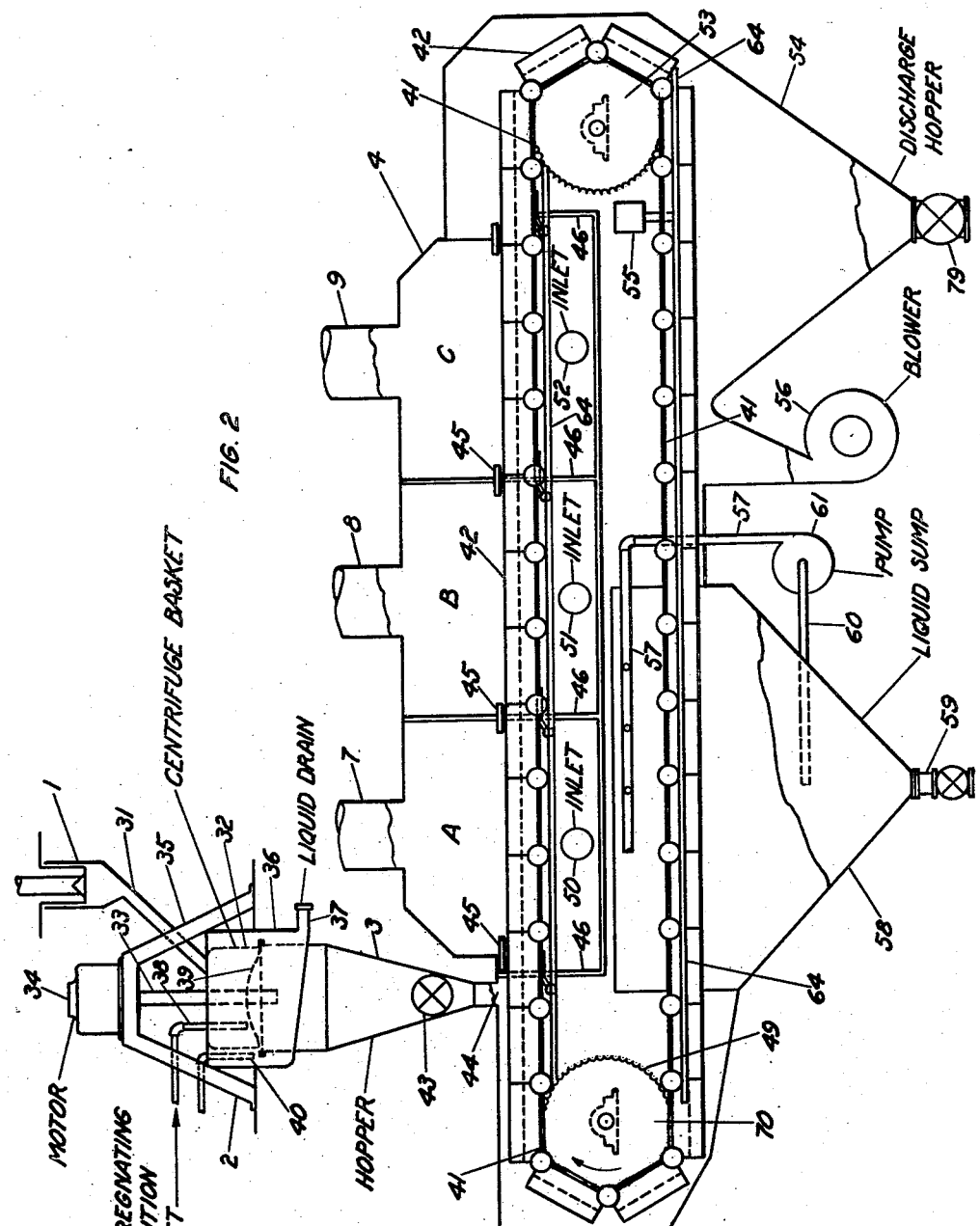

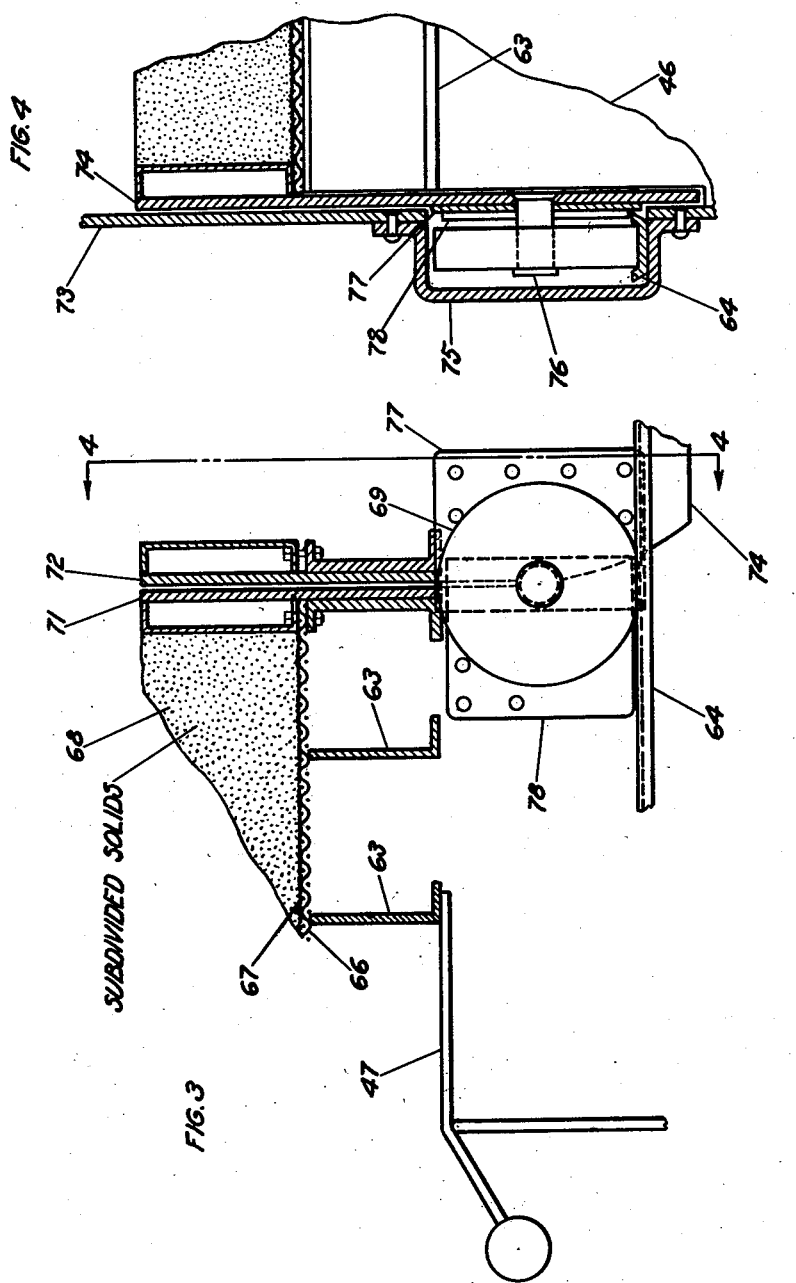

2,816,372

DRYING APPARATUS

Rolland D. Myers, Edgewood, and Saul Hormats, Baltimore, Md., assignors to the United States of America as represented by the Secretary of War, as trustee Original application June 27, 1944, Serial No. 542,426. Divided and this application December 7, 1951, Serial No. 268,115

1 Claim. (Cl. 34—216)

(Granted under Title 35, U. S. Code (1952), sec. 266)

The invention described herein may be manufactured and used by or for the Government, for governmental purposes, without the payment to us of any royalty thereon.

This application is a division of our original application entitled Method for Preparing Catalytic Adsorbents filed in the Patent Office June 27, 1944, Serial No. 542,426.

This invention relates to an improved method for producing contact catalysts and, more particularly, to granular or subdivided solids impregnated with catalytically active metal compounds, such as whetlerized charcoals.

Although the invention is directed mainly to the production of impregnated charcoals having high efficiency for separating toxic gases or the like from air, it is advantageously applicable in providing other types of contact catalysts or sorptive agents with improved efficiency.

For a number of reactions, such as hydrogenation, oxidation, hydration, dehydration and splitting, oxides and salts of metals which can exist in two or more states of oxidation are the most important catalysts. These compounds act as contact catalysts when present as solids in gases, vapors, and liquids undergoing reaction. The catalytic solids may be in lump, granular, pelleted, fibrous or powdered form; they may be by themselves or supported on carriers which are inert or which promote catalytic activity. Generally the carrier is impregnated with the supported catalytic compound; and, in general, the most active catalysts are metal oxides which are very sensitive to reducing gases.

Aside from activated carbons or chars, other types of solids which may be impregnated are silica gel, bauxite, alumina, activated alumina, fuller's earth, diatomaceous earth, asbestos, soda lime, clays, both natural and synthetic, and other solids of a more or less porous adsorptive nature. Liquid and gaseous agents which may be used in impregnating these solids include salts, alkaline and neutral compounds.

Impregnated charcoals known as whetlerites have been found to be effective for removing from air contaminants which have irritant and toxic physiological effects on human beings. Whetlerites, accordingly, have been important for use in gas mask canisters and the like. They have been produced by first soaking an activated carbon or charcoal in an aqueous copper salt solution, such as a solution of copper ammonium carbonate complex, removing excess solution, reacting the adsorbed salts and drying the impregnated charcoal. The final salt left deposited around the charcoal may comprise a mixture of copper oxide and copper hydroxide. Recently, it has been found that compounds of metals other than copper can be included in the whetlerizing solution to provide chars having improved properties. Investigations have indicated that there are wide variations in the efficiency of whetlerites, depending upon the method of preparation.

In hitherto used methods for drying wet impregnated solids, the volatile material was subjected to a forced boiling at elevated temperatures without concern about the reactivity of the volatilized substances with the residual impregnant.

From results obtained with the present invention, it has been indicated that a certain number of new principles can be employed jointly and severally for improving the efficiency of the catalysts.

A procedure found to be highly efficacious for impregnating adsorbent solids makes use of centrifugal force to insure penetration of a liquid into solid particles.

It has been found that a product of enhanced activity is obtained by drying the impregnated solid in thin layers, e. g., layers about one to six inches thick, exposed to circulated hot drying gases to dilute and rapidly remove the volatilized liquid.

A more uniform product of high catalytic efficiency is obtained by treating the impregnated solid in a layer of substantially uniform thickness, as, for example, in trays of suitable dimensions, to have substantially all parts of the layer become dry simultaneously, and by following the drying directly by conversion to the active catalyst. This kind of treatment in a continuous and expeditious manner on a large scale was not attainable with any formerly available apparatus.

It is beneficial to maintain the drying solid at low temperatures, e. g., below about 100° C., the normal boiling point of water, and preferably below 50° C., until the impregnated mass is substantially dry, before raising the temperature to a conversion point, above 100° C.

While heated air was found to be a most practicable drying medium, other gases, such as nitrogen, carbon dioxide, oxygen and the like, or mixtures of such gases, are effective for diluting and removing hot water vapors without injury to the activity of the catalyst. The oxidizing drying gases may also serve as activating gases at suitable temperatures.

The drying gas may comprise a stabilizing or promoting agent, such as ammonia gas or carbon dioxide, prior to final drying and activation or conversion; and in order to avoid excessive dilution of evolved vapors with consequent difficulty in the recovery of such an agent, the drying medium may contain a high concentration of the stabilizing agent for recycling after separation of volatilized liquid.

For accomplishing the desired results expediently on a practical basis, a new type of apparatus was designed, and the method of this invention will be described with reference to this apparatus, which is illustrated diagrammatically in the accompanying drawings.

In the drawings,

Figure 1 shows a schematic flow plan for carrying out the process with a simplified elevational view of the apparatus.

Figure 2 represents a schematic internal arrangement of the main parts of the apparatus.

Figure 3 is an enlarged, fragmentary, sectional view of the box trays used in carrying impregnated catalysts within the apparatus shown in Figures 1 and 2. This view illustrates details at the juncture of the boxes.

Figure 4 is a detailed transverse sectional view of the conveyor boxes taken on line 4—4 of Figure 3.

Referring to Figure 1, solid material to be treated is charged from feed hopper 1 into centrifuge 2 for impregnation. From the centrifuge, the impregnated solid material, wet internally but preferably dry at the surface and free flowing, is discharged into the hopper bin 3 from which it may be flowed onto a conveyor within the drier 4. Further details on the conveyor will be given in connection with Figure 2, with which the functioning of the drier will also be further discussed. The drier 4 carries a driving pulley 5 motivated by a prime mover or motor 6 for causing movement of the conveyor within the drier. Attached to the drier 4 are any desired number of conduits 7, 8, 9 and 10 for removing gases and vapors from each separate treating chamber A, B and C within the drier. Each of these conduits contains a shut-off valve 11 and a valved by-pass vent 12.

A conduit 13, into which may be connected any of the gas outlet lines 7, 8, 9, from the treating chambers of drier 4, is provided to effect a recycling of gases. Conduit 13 leads to a blower 14 which in turn forces the gases through valve-controlled by-pass conduit 15, conduit 16 following separation unit 17, or serially through unit 17, which functions to strip the gases of undesired condensible vapors, then through a reheating unit 18. Recycled gases may be returned to one or more chambers in drier 4, e. g., by conduit 19 with any desired amount of fresh added make-up gas from line 20. Blower 21 is provided to force a fresh drying gaseous medium through conduit 22 to be heated in heating unit 18 and injected into drying and conversion chambers of drier 4.

In using the unit 17 to recover ammonia or recycle gas having a high concentration of ammonia, this unit may be provided with an air cooler followed by a refrigerating means to condense out aqueous ammonia and ammonium compound vapors in a manner well known to the art. Likewise, the refrigeration may be followed in circuit by a silica gel adsorption unit if desired, and recovered ammoniacal liquors may be redistilled to obtain a strong ammonia liquor or to separate ammonia from water, as in the ammonia absorption process used in refrigeration. The method and apparatus employed for removing water from ammonia is not necessarily novel and, therefore, is not described in detail.

Operations will now be discussed with reference to Figure 2. In the process, the material which is to be treated is supplied from a charging device 1 which may measure the charge. The initial solid material placed in 1 may be a solid compound, a carrier, an impregnated carrier or a partially impregnated carrier. Considering that the initial solid material is activated carbon, charcoal or similar finely divided absorbent material, which is to be impregnated, from hopper 1 the charcoal is discharged through a pipe 31 against the top part of a basket 32 in centrifuge 2. The centrifuge basket is rotated on spindle 33 by the motor 34 supported on the fixed standards 35. Liquid which flows through the centrifuge basket is collected in the surrounding stationary vessel 36 and discharged through drain 37.

The rate of rotation of the centrifuge and the manner of discharging material into the centrifuge may be adjusted to give a fairly uniform annular layer of charcoal from top to bottom on the sides of the basket. An impregnating solution made to flow through pipe 38 is sprayed onto the layer of charcoal until it is saturated. The speed of the centrifuge is then increased in order to employ centrifugal force sufficient to drive the liquid into the pores of the charcoal particles and through the charcoal layer. After the charcoal is well saturated, the spray of impregnating solution is turned off and centrifuging is allowed to proceed for about one minute to remove any excess liquid. At this point, a discharge gate 39 at the bottom of the basket 32 is dropped, and an air supply line 40 is opened to blow a series of air jets against the basket 32 in order to completely remove the impregnated charcoal from the wall of the basket and force the impregnated charcoal into hopper bin 3. The described operations can be accomplished with the aid of automatic electrical controls, utilizing timer-operated valves, motor and signals, which are not shown.

The drying and conversion technique of the present invention may be used with other suitable methods of impregnating, but preferably is employed with an impregnation procedure capable of saturating a solid porous material prior to a controlled drying and conversion of the impregnating material. The preferred impregnation procedure brings about a replacement of adsorbed air by the impregnating liquid in microscopically small pores and leaves the surface of the porous particles with a dry feel. The particles are thus free flowing, do not conglomerate or clog the screen on the trays, and reduce channeling in gas flow through the layer.

The drier 4 is of a continuous type and possesses excellent flexibility in operation. Within the drier 4 is a continuous or endless conveyor 41 comprising a series of inter-linked box-shaped trays 42. This conveyor is arranged to carry the material through any desired number of separate treating chambers, e. g., A, B and C in each of which conditions can be independently controlled, and then to discharge the treated material in a substantially continuous manner.

In order to fill the trays of the conveyor boxes 42 completely and uniformly, the hopper 3 is provided with regulating discharge valve 43 and narrows to a suitable dimension, about four inches, forming an opening 44 which extends across the drier to a width of about six feet, or the width of the boxes. The plates 45 are disposed to prevent overflow of charcoal at the filling and to restrict the flow of gas between the partitioned chambers A, B and C. The partitions 46 between the chambers, and to which the plates 45 are attached, are adjusted into position to permit a longer or shorter operation in any of the chamber compartments. The sizes of the compartments may thus be changed as required by changes in the process. For example, the space A may be reduced and used for contacting a relatively cool stream of ammonia with the wet impregnated charcoal, or this space may be increased in size in treating the impregnated charcoal with a heated drying gas or a drying gas containing ammonia to accomplish removal of water. Plates 47 which are counterweighted and pivoted on partitions 46 effect a closure against lower members of the conveyor boxes as shown in the detailed view of Figure 3. The train of boxes is made to move by the rotation of the driving pulley 5 which in turn rotates a wheel having sprockets 49 to move the conveyor, as in a chain and gear mechanism.

The conveyor as viewed in Figure 2 is moved in a clockwise direction so that the conveyed solids are passed at a predetermined rate through the treating chambers A, B and C. Gas inlets 50, 51 and 52 admit streams of treating and drying gases into each of the chambers at controlled temperatures and rates of flow. The treating and drying gases pass up through the layers of conveyed solids, and effluent gases and vapors are withdrawn from each of the chambers by lines 7, 8 and 9. When ammonia is present in the drying gases used in either of the first two chambers A and B, or both, according to the process employed, and a necessity for effecting a recovery thereof exists, the ammonia may be recovered by sending the effluent gases from these chambers to an ammonia separation unit 17 as has been described.

Following the treatment, the tray boxes become tipped and inverted as they pass over wheel 53 and thereupon discharge their solid contents into the hopper 54. A vibrator 55 of conventional commercial type may be provided to remove most of the solid which does not readily fall into the discharge hopper 54. The vibrator may be attached to a section of the lower rail 64 supporting the inverted boxes above the hopper 54. A valve 79 is provided at the bottom of hopper 54 for removal of collected solid products. The closure member of this valve may be of the cross-vane type for continuous removal of the solids as the vanes are rotated.

After discharging their contents into hopper 54, the boxes 42 may be passed over an air blast from blower 56 to effect cooling and then under a wash spray from pipe 57. A suitable wash liquid for dissolving and removing copper oxide and other copper compound scale from the boxes is an aqueous ammonium carbonate carbamate solution.

The wash solution is collected in the liquid sump 58 provided with a valved sludge drain 59, and liquid may be recycled from the sump through line 60 by pump 61 to be returned to spray line 57. Space is allowed for draining of the boxes as they proceed to pass over wheel 70, after which they are ready for recharging under hopper 3.

A mode of construction and functioning of the conveyor boxes 42 will be explained by reference to the detailed views in Figures 3 and 4 together with Figure 2. The boxes may be of any suitable dimensions, e. g., two feet by about six feet, the six-foot dimension being the width of the conveyor. The bottom of each box has L-shaped angle iron members 63 spaced a definite distance apart and attached to the sides 74 of the boxes. These L-shaped members support a reinforcing screen, e. g., a 4 to 10 mesh steel wire screen 66, on which is sufficiently fine mesh screen, e. g., a No. 35 steel wire screen 67, to support a layer 68 of the finely divided solid material subjected to treatment. The layer of impregnated charcoal may be from about one inch to six inches thick, for example.

Each box 42 rides on a set of rollers 69 in a swivel relationship to the adjacent boxes riding on the same set of rollers. The rollers are on both sides of the boxes and run in grooved tracks or on rails 64 except at the places where the conveyor passes over the sprocketed wheels 70 and 53. Thus, when the boxes pass over the wheels 70 and 53, their end walls 71 and 72 become separated. The sprockets 49 of wheels 70 and 53 may be arranged to move the conveyor by pushing against the L-shaped members 63.

As shown in Figure 4, the interior sides 73 of the drier 4 are nearly contiguous with the sides 74 of the boxes. In order to prevent passage of gas from one chamber to another within the drier and to provide necessary working clearance, the steel plate sides 74 of the boxes nearly touch or bear against the inner surfaces of the drier. A clearance of about 0.07 inch is satisfactory for preventing undue stresses. A gas seal is obtained at the bottoms of the boxes as they pass the partitions 46 by the pivoted plates 47 sliding against the bottom parts of the L-members 63 in the boxes. The rollers 69 are guided by the tracks 64 within the covers 75 and carry the boxes on axles 76. Plates 77 and 78 fixed to the side walls of the boxes serve to link the boxes to the axle and to further seal off gas movement between the chambers. Thus each box can share its front two wheels and back two wheels with the front and back adjacent boxes respectively. By having the linked plates 77 and 78 differ a little in size and overlapping in a sliding relationship, interference between the ends of the boxes is avoided when the ends are separated, and a good gas seal is obtained. The tracks may be slightly inclined to aid the movement of the boxes through the chambers.

Although the described drier is particularly adapted for the process of this invention and has many advantages over existing designs, it is to be understood that other types of apparatus may be devised to carry out the process. It is to be noted that the described apparatus has provisions for conducting the process continuously. It provides for continuous charging of the initial materials, successive treatment steps under independently controlled conditions, and continuous removal of the products. It permits the solid material to be subjected to uniform treatment with an efficient use of the treating gases. The thickness of the solid material undergoing treatment is controlled. The types of gases used in the treatment can be varied, and the conditions of treatment can be changed to conform to the requirements of the material.

In carrying out modifications of the present invention with available types of apparatus, other than that described, to obtain impregnated charcoal or contact catalysts of maximum quality, two or a plurality of driers may be connected in series, the first one to be supplied, for example, with substantially pure ammonia or with recycled air containing ammonia at high temperatures for a partial drying of the wet solids, and the second to be supplied with heated air for drying at a more elevated temperature. The effluent gases from the first drier may be recycled to conserve the ammonia and may be passed through a unit which removes water and maintains the ammonia concentration at a proper level.

If the quality of the impregnated charcoal to be produced requires a preliminary drying in the presence of ammonia or other stabilizing gas, followed by an intermediate air drying, and a final drying to remove the residual stabilizing gas, this process can be carried out in the three successive chambers A, B and C of the drier described instead of two chambers, or requires three commercial-type unit driers in series. Ammonia may be recovered from the effluent gas in the second treatment if the concentration of the ammonia is sufficiently high to warrant the recovery. The final treatment wherein traces of ammonia are removed from the catalyst, in general, does not warrant the recovery of ammonia or recycling of the gas. It is to be borne in mind, however, that in using any type of drier which does not provide for a treatment of the solid material in a uniform thin layer or uniform small mass with a controlled stream of drying gas in order to obtain quick uniform removal of water from the solid, the quality of the product becomes lowered.

Commonly the activity of the catalysts depends mainly on the character of the surface of the catalysts which in turn depends upon the final steps in the preparation of the catalysts. The metal oxide catalysts are often prepared by reaction between an oxidizing agent and a salt of the metal which is to be converted into the oxide. This reaction may be carried out in an aqueous solution, and the precipitate or insoluble solids formed in the reaction may be dried or used for impregnating a carrier which is to be heated and dried. For example, one method of preparing a copper oxide impregnated charcoal comprises treating an activated charcoal with an aqueous solution of a copper salt, e. g., copper sulfate or copper chloride, then reacting the copper salt impregnant with an alkaline substance such as a caustic solution. In another method of impregnating charcoal, the charcoal is wetted with an aqueous solution of copper ammonium carbonate complex. For other types of catalysts, the following will serve as an example: Zinc oxide is stirred into chromium nitrate solution. The reaction product mixture is evaporated to dryness, and the heat is continued until the nitrate is converted into oxide. The solid product may be mixed with a binder, then dried and granulated. On the other hand, the initial materials may be reacted in impregnating a carrier, and the impregnated carrier may be dried and heated. The steps of heating and drying are advantageously carried out in accordance with the present invention to improve the activity of the catalysts. When the carrier is of a combustible nature, such as chars or activated carbon, the upper limit of the heat treatment is restricted by the temperature to which the char begins to glow or ignite in an oxidizing atmosphere. This upper limit is of the order of 180° C. to 200° C.

As previously pointed out, one of the serious difficulties in the final treatment of the catalysts occurs through the effects of the moisture on the dried or converted oxide products. If there is considerable overlapping of the drying and conversion stages, there is a likelihood that the residual moisture during the conversion will deteriorate the converted catalysts. This effect is greatly minimized by the process of this invention. In this process, the drying is accelerated. During the drying, solid catalysts mass is cooled due to the removed heat of the evaporation, but the temperature of the drying gas may be increased to compensate for the temperature drop so that the solid material attains a temperature of not more than 100° C. or whatever temperature is critical when the material has just reached the nearly dry stage, Thus, a stabilizing gas, such as ammonia, or air containing a stabilizing gas at a temperature above 100° C., e. g., about 135° to 150° C., may be used for the preliminary drying without deterioration of the catalytic material if the flow of hot gas and the body of catalysts have a controlled relation to keep the mass below the critical temperature until the water is nearly all evaporated. And then, by continuing the process, the solid particles are gradually raised in temperature to the conversion point. If air is employed alone for the drying, the drying is completed at an optimum temperature, preferably in the range of 30° C. to 50° C., before the conversion is obtained of the substantially dry material at above 100° C., or preferably about 140° C. to about 180° C. It is indicated that the volatilized moisture tends to cause a reduction of the moisture-sensitive metal oxide catalysts, copper oxide and the like, as the temperature is increased to above 100° C. The following data illustrates the effects of drying gases free of moisture in contrast to drying with water vapor present on the catalytic activity of whetlerite:

|  | Catalytic Activity towards HCN, Minutes Absorption |
| --- | --- |
| Drying in contact with steam | 8, 12 |
| Drying with heated air | 106 |
| Drying with heated $CO_2$ | 118, 98 |
| Drying with heated $N_2$ | 97 |
| Drying with heated $O_2$ | 102, 98 |

Similarly, it has been observed that water vapor from the bottom part of a thick layer of impregnated adsorbent very deleteriously affects a top part of the thick layer in which all parts are not dried simultaneously.

Also, it has been observed that if the ammonia content of the impregnating solution is increased from about 7% to about 14%, the efficiency of the whetlerite is doubled. This effect may be due to the dried whetlerite containing more $CuCO_3.CuO$ in using a low concentration of ammonia and at a higher concentration containing more $CuCO_3.Cu(OH)_2$, which is considered to be more stable at temperatures near and above 100° C. at which reduction becomes rapid.

The activity or sorptive power of the catalyst is determined by passing a standard concentration of a toxic gas mixed with air through a tube containing a standard amount of the catalyst; the time elapsed before the toxic gas appears in the exit gases leaving the tube is a measure of the absorption power.

In the steam-dried product, numerous particles with a coating of metallic copper were found, the whetlerite was soft and decomposed, and the exit gases from the drier contained carbon dioxide. Similarly, if the impregnated adsorbent is wet at the surface and in deep beds, water drained toward the bottom leads to formation of steam which adversely affects the product. Once the water is removed, the whetlerite becomes more stable at elevated temperatures, and the best activity is obtained when the final activation treatment can be carried out at elevated temperatures of about 140° to 180° C., preferably with an oxidizing gas.

From an interpretation of results, another factor of activity is the impregnating compound content of the adsorbent. If the impregnation precipitates salts which clog the capillaries, the activity is lowered. A stabilizing agent, such as ammonia or carbon dioxide, apparently serves to keep the salts in solution so that the solution can penetrate into the capillaries.

The term "sorptive" as used herein denotes the capacity of a solid to hold or concentrate gases, liquids, or dissolved substance at its surface physically as by adsorption or chemically as by absorption.

It is to be understood that modifications may be made in the foregoing procedures in practising the invention without departing from the scope thereof.

We claim:

An apparatus for continuous drying of particulate matter, which comprises an inclosing casing, an endless conveyor within said casing, driving means for moving said conveyor, said conveyor comprising a series of interlocked box shaped trays having perforated bottoms, said trays being mounted on rollers positioned at each end of the tray, adjacent trays sharing a pair of rollers at each end, said rollers being exterior of the tray and moving in inclosed tracks exterior to the casing, said trays being closely positioned adjacent each other and adjacent the casing, charging means at one end of said conveyor, discharge hopper to receive the contents of said trays at the other end of said conveyor, means for blowing gases through said perforated bottom trays within limited sections of said casing and conveyor.

References Cited in the file of this patent

UNITED STATES PATENTS

| 583,361 | Droeshout | May 25, 1897 |
| 761,088 | Meyer | May 31, 1904 |
| 858,302 | Mapp | June 25, 1907 |
| 1,494,830 | Cook | May 20, 1924 |
| 1,761,016 | Koehring et al. | June 3, 1930 |
| 2,030,734 | Baird | Feb. 11, 1936 |
| 2,125,382 | Lykken et al. | Aug. 2, 1938 |
| 2,216,304 | Thornton | Oct. 1, 1940 |
| 2,400,907 | Behrman | May 28, 1946 |
| 2,432,964 | Clark | Dec. 16, 1947 |
| 2,523,552 | Birdseye | Sept. 26, 1950 |
| 2,525,348 | Glass | Oct. 10, 1950 |